United States Patent
Sonoda et al.

(10) Patent No.: US 7,207,377 B2
(45) Date of Patent: Apr. 24, 2007

(54) HEAT EXCHANGER

(75) Inventors: Yoshihiko Sonoda, Tokoname (JP); Hiroyuki Osakabe, Chita-gun (JP); Masahiro Omae, Kariya (JP)

(73) Assignee: DENSO Corporation, Kariya (JP)

( * ) Notice: Subject to any disclaimer, the term of this patent is extended or adjusted under 35 U.S.C. 154(b) by 0 days.

(21) Appl. No.: 11/370,214

(22) Filed: Mar. 7, 2006

(65) Prior Publication Data

US 2006/0201666 A1  Sep. 14, 2006

(30) Foreign Application Priority Data

Mar. 8, 2005  (JP)  ............................. 2005-064408

(51) Int. Cl.
*F28F 13/18*  (2006.01)
*F28F 21/06*  (2006.01)

(52) U.S. Cl. ...................................... 165/133; 165/180

(58) Field of Classification Search ................ 165/133, 165/135, 180

See application file for complete search history.

(56) References Cited

U.S. PATENT DOCUMENTS

| | | | | |
|---|---|---|---|---|
| 3,455,338 A | * | 7/1969 | Pollit | 138/178 |
| 3,489,209 A | * | 1/1970 | Johnson | 165/133 |
| 3,724,537 A | * | 4/1973 | Johnson | 165/133 |
| 3,968,786 A | * | 7/1976 | Spielberg | 126/676 |
| 4,923,004 A | | 5/1990 | Fletcher et al. | |
| 5,078,946 A | | 1/1992 | Fletcher et al. | |
| 5,211,220 A | * | 5/1993 | Swozil et al. | 165/133 |
| 6,589,617 B2 | * | 7/2003 | Hsich et al. | 428/35.9 |
| 2004/0244954 A1 | * | 12/2004 | Goto et al. | 165/153 |

FOREIGN PATENT DOCUMENTS

| | | | | |
|---|---|---|---|---|
| EP | 97905 | A2 | * | 1/1984 |
| EP | 385731 | A | * | 9/1990 |
| FR | 2395481 | A | * | 2/1979 |
| JP | 62175597 | A | * | 8/1987 |
| JP | 63194195 | A | * | 8/1988 |
| JP | 63-311084 | | | 12/1988 |
| JP | 92041279 | B | * | 7/1992 |
| JP | 2003-181628 | | | 7/2003 |

* cited by examiner

*Primary Examiner*—Allen J. Flanigan
(74) *Attorney, Agent, or Firm*—Harness, Dickey & Pierce, PLC

(57) ABSTRACT

A heat exchanger having a plurality of stacked tubes (131) and tanks (110, 120) formed of resin and coupled to the longitudinal ends of the tubes (131), wherein the cooling liquid flowing in a fuel-cell (10) is cooled by being passed through the tubes (131) formed of double layers including a high heat conductivity resin portion (131*a*) and an insulative resin portion (131*b*).

5 Claims, 4 Drawing Sheets

HEAT EXCHANGER

TECHNICAL FIELD

This invention relates to a heat exchanger for cooling the fuel-cell of a fuel-cell powered vehicle.

BACKGROUND ART

In recent years, a clean fuel-cell powered vehicle, which does not generate any material harmful to the environment, has been under development. The fuel-cell must be cooled by a heat exchanger. During power generation by the fuel-cell, a high voltage is impressed on a cooling medium (such as the cooling water), and therefore the heat exchanger must be electrically insulated.

As a method designed to meet this requirement, the heat exchanger is configured of an insulating material (thermoplastic polymer) (Japanese Unexamined Patent Publication No. 63-311084) or the inner surface of a metal heat exchanger is covered with an insulating material (coated with resin) (Japanese Unexamined Patent Publication No. 2003-181628).

The heat exchanger configured of the insulating material described above, however, has a much lower heat conductivity than the configuration of an aluminum material (about one thousandth of the heat conductivity of aluminum), and therefore the heat transfer performance is deteriorated. The heat conductivity can be increased by mixing a metal material at the sacrifice of a reduced electrical resistance. Thus, as the insulation characteristic cannot be maintained, the heat conductivity cannot be easily improved.

Also, in the heat exchanger of a metal covered with an insulating material as described above, the inner surface of a complicated shape is covered with the insulating material. Depending on the shape, therefore, some parts may not be covered and it is very difficult to apply the insulating material in a state free of pinholes (defects).

SUMMARY OF THE INVENTION

In view of the problem described above, the object of this invention is to provide a heat exchanger which can be insulated from a fuel-cell without considerably deteriorating the cooling performance.

In order to achieve the aforementioned object, this invention employs the technical means described below.

According to this invention, there is provided a heat exchanger comprising a plurality of stacked tubes (131) and resin tanks (110, 120) coupled to the longitudinal ends of the tubes (131), wherein the cooling liquid flowing in the fuel-cell (10) is cooled by being passed through the tubes (131), and wherein the tubes (131) are formed in two layers of a high heat conductivity resin portion (131a) and an insulative resin portion (131b).

As a result, the cooling liquid impressed with a high voltage by the operation of the fuel-cell (10) can flow through the heat exchanger (100) while being insulated from outside by the resin tanks (110, 120) and the insulative resin portion (131b) of the tubes (131).

Also, the heat transfer can be improved by the high heat conductivity resin portion (131a) of the tubes (131) and, therefore, the cooling performance of the heat exchanger (100) is not considerably deteriorated in spite of a resin being used as a basic material.

Further, the weight and cost can be reduced by making the tubes (131) of a resin material. Unlike the tube of a metal material, flux used in brazing does not ooze out into the cooling liquid, thereby preventing contamination of the cooling liquid.

According to this invention, the double-layer structure of the tubes (131) is preferably formed by a multilayer extrusion molding process.

According to this invention, an adhesive layer is formed on the surface of the tubes (131).

Therefore, the tubes (131) and the tanks (110, 120) can be easily coupled to each other, and so can the fins (132) normally arranged between the tubes (131).

Also, according to this invention, an insulative resin portion (131b) is formed on the inside of the tubes (131) and a high heat conductivity resin portion (131a) on the outside of the tubes (131).

The high heat conductivity resin portion (131a) is preferably formed of a metal-containing resin in this invention.

The reference numerals in the parentheses attached to the names of the respective means described above indicate the correspondence with the specific means included in the embodiments described later.

This invention will be more fully understood from the attached drawings and the description of preferred embodiments.

DESCRIPTION OF THE PREFERRED EMBODIMENTS

First Embodiment

Figure 1:
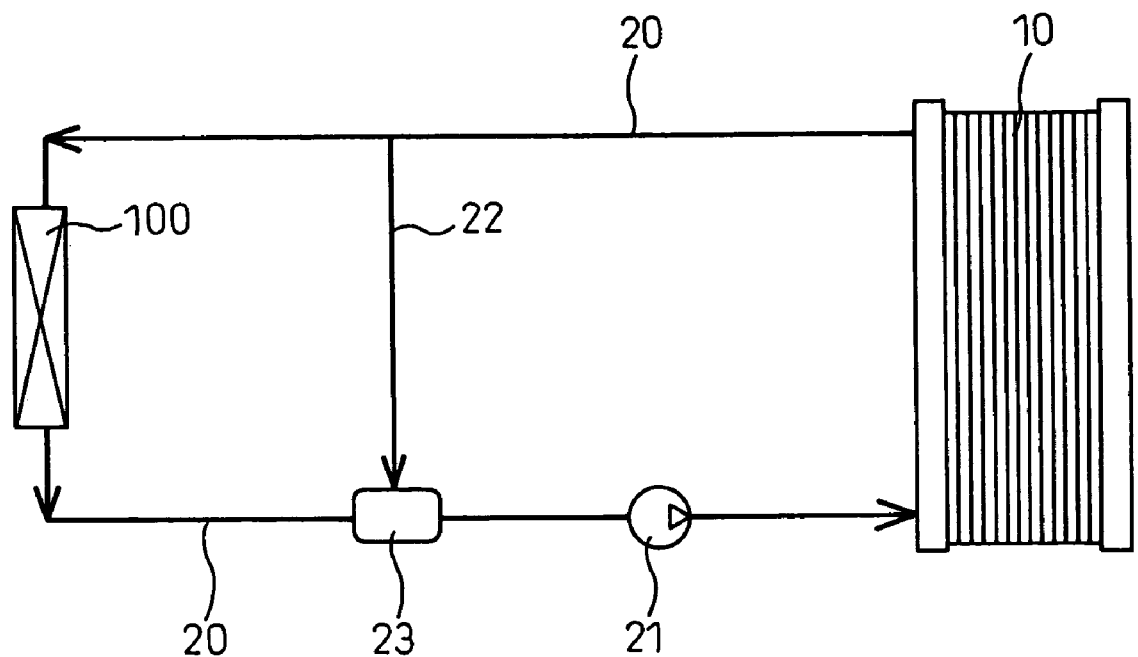
FIG. 1 is a schematic diagram showing a cooling system as a whole of a fuel-cell according to this invention.

A heat exchanger according to a first embodiment of the invention is shown in FIGS. 1 to 4. This embodiment is an application of the invention to a radiator 100 for cooling the cooling water passed through a fuel-cell 10. This radiator is mounted on a fuel-cell powered vehicle having a motor driven with the fuel-cell 10 as a power supply. FIG. 1 is a schematic diagram showing the whole fuel-cell cooling system according to the invention, FIG. 2 a front view showing a general configuration of a radiator 100, FIG. 3 an enlarged sectional view showing the neighborhood of the joint between tubes 131 and a plate portion 112, and FIG. 4 a sectional view showing one of the tubes 131.

First, the cooling system of the fuel-cell 10 is explained briefly with reference to FIG. 1. The fuel-cell 10 generates electric power by a chemical reaction between hydrogen and oxygen, as is well known, and includes a fuel cell stack having a plurality of series-connected cells with high polyelectrolytic films held between the positive and negative electrodes thereof and an external casing for accommodating the fuel cell stack therein.

A cooling water path 20 formed of an insulating material is connected at two points on the external casing of the fuel-cell 10. The cooling water path 20 is specifically formed of a hose or a pipe of resin or rubber material. The radiator 100 and a water pump 21 are arranged, in that order, midway in the cooling water path 20. The water pump 21 is operated so that the cooling water in the external casing of the fuel-cell 10 is circulated, in the direction of the arrows in FIG. 1, through the cooling water path 20 and the radiator 100. The cooling water, like that normally used in a gasoline engine vehicle, is an antifreeze solution composed of a mixture of water and ethylene glycol.

The cooling water path 20 has a bypass 22 in parallel with the radiator 100. The bypass 22, like the cooling water path 20, is formed of a hose or a pipe of rubber or resin. A thermostat 23 is arranged at the joint between the bypass 22 and the cooling water path 20 on the downstream side of the bypass 22. Thus, the flow rate of the cooling water flowing in the radiator 100 and the bypass 22 is adjusted according to the water temperature.

Figure 2:
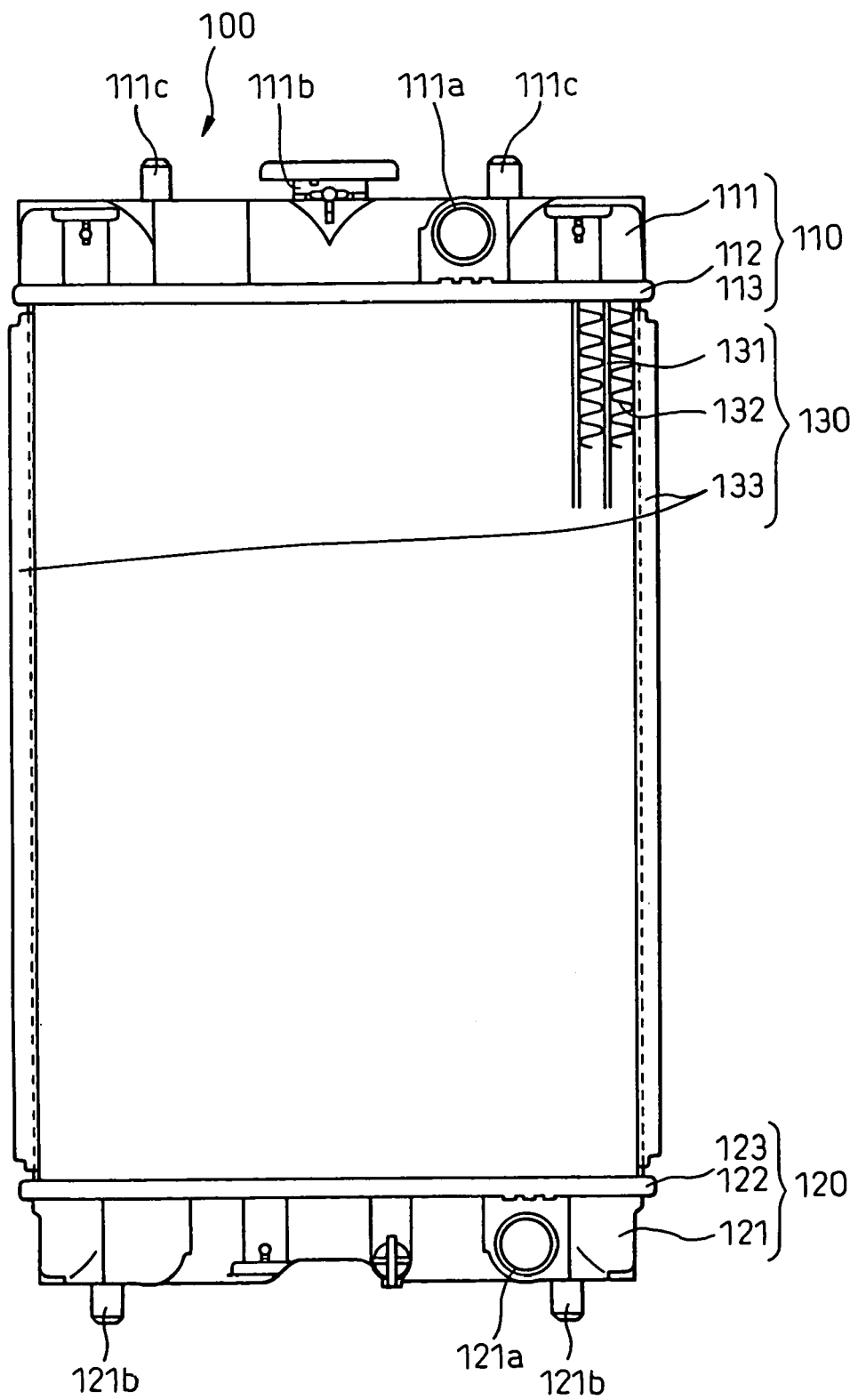
FIG. 2 is a front view showing a general configuration of a radiator.
Figure 3:
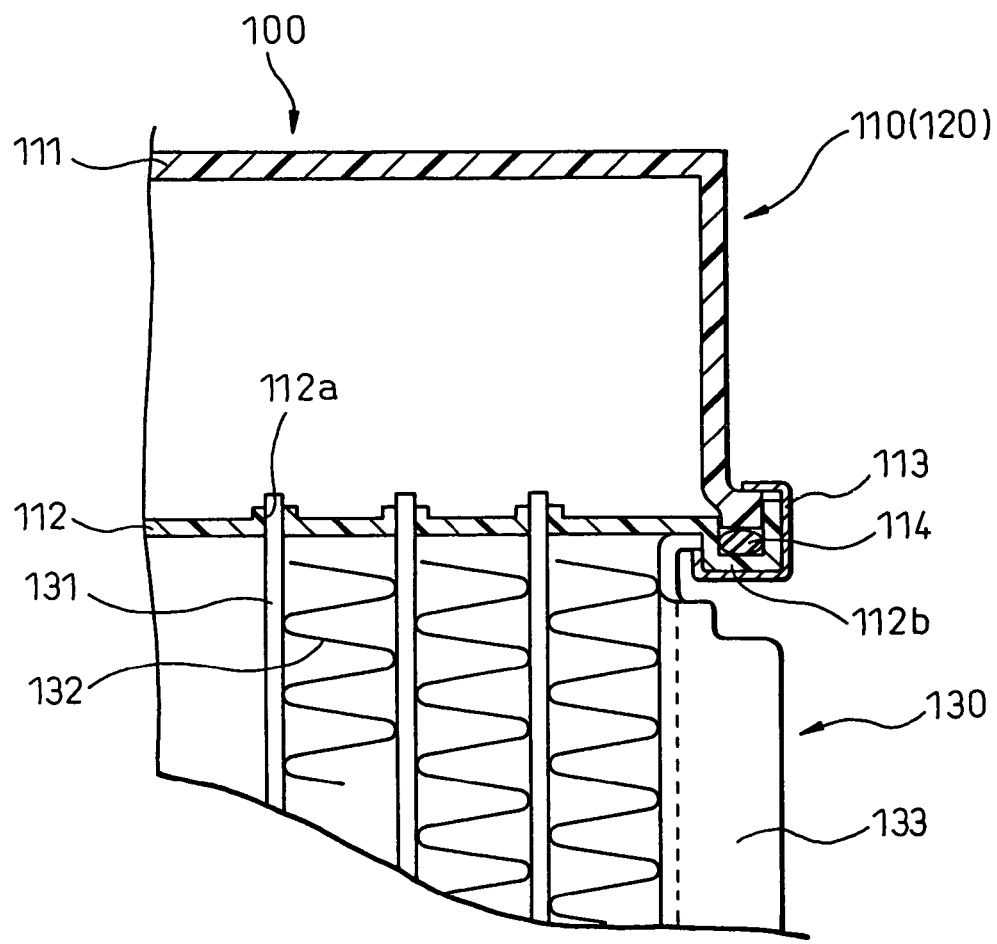
FIG. 3 is an enlarged sectional view showing the neighborhood of the joint between the tubes and the plate portions according to a first embodiment.

The radiator 100 is a vertical-flow type, in which, as shown in FIGS. 2 and 3, the cooling water in the tubes 131 of a core portion 130 flows downward in the drawing. The radiator 100 is basically configured of an upper tank 110, a lower tank 120 and the core portion 130.

The upper tank 110 and the lower tank 120 are configured of tank bodies 111, 121 and plate portions 112, 122, respectively. The tank bodies 111, 121 and the plate portions 112, 122 are both formed of resin. A suitable resin material of these component members making up the radiator 100 is, for example, polyphenylene sulfide (PPS) which is high in moldability, rigidity and heat resistance.

The tank bodies 111, 121 have a substantially U-shaped cross section, and each constitutes a container with an open side facing the plates 112, 122. The upper tank body 111 is integrally formed with a pipe portion (inlet pipe) 111a, a cooling water injection port 111b and a mounting portion 111c to be mounted on the vehicle. The lower tank body 121, on the other hand, is formed integrally with a pipe portion (outlet pipe) 121a and a mounting portion 121b.

The plate portion 112, 122 is an elongated tabular member having a plurality of tube holes 112 arranged in longitudinal direction. A tank insertion portion 112b, into which the opening-side outer peripheral portion of the tank bodies 111, 121 is inserted, is formed on the outer periphery of the plate portions 112, 122.

A seal packing (seal member) 114 is interposed between the opening-side outer peripheral portion of each tank bodies 111, 121 and the tank insertion portion 112b of the plate portions 112, 122. The tank bodies 111, 121 and the plate portions 112, 122 are thus mechanically coupled by caulking of metal caulking plates 113, 123.

The tank bodies 111, 121 and the plate portions 112, 122 can be coupled to each other by bonding or welding instead of caulking (without using the seal packing 114).

The core portion 130 is formed of a plurality of tubes 131 stacked (horizontally in FIG. 2), a plurality of fins 132 formed of thin corrugated strip members arranged on the outside of and between the tubes 131 along the stacking direction and a plurality of side plates 133 having a channel-shaped cross section arranged on the outside of the leftmost and rightmost fins 132 as reinforcing members. The longitudinal end portions of the tubes 131 are fitted in the tube holes 112a of the plate portions 112, 122, and the longitudinal end portions of the side plates 133 are kept in contact with the plate portions 112, 122.

The tubes 131 and the side plates 133 of the core portion 130 are formed of resin, and the fins 132 one formed of a metal (aluminum).

Figure 4:
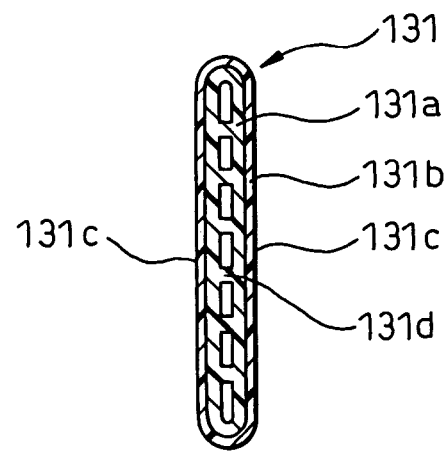
FIG. 4 is a sectional view showing the tube according to the first embodiment.

The tubes 131, as shown in FIG. 4, have a flat cross section, and are formed as a double structure including a first layer portion 131a as a high heat conductivity resin portion and a second layer portion 131b as an insulative resin portion. The first layer portion 131a is, for example, a mixture of polyphenylene sulfide (PPS) and a metal powder of aluminum or copper. The second layer portion 131b is formed of, for example, polyphenylene sulfide (PPS) itself, and the tubes 131 are formed by a multilayer extrusion molding process using these two types of materials. In the multilayer extrusion molding process, an extrusion with a thick cross section is followed by tensioning into a predetermined sectional size to form the tubes 131 free of defects such as pinholes.

A plurality of partitioning walls 131d connecting the flat portions 131c are arranged in the tubes 131. The partitioning walls 131d suppress the deformation of the flat portion 131c along the short diameter of the tubes 131 for a higher strength (pressure resistance) against the internal pressure of the cooling water flow. Also, the equivalent circle diameter of each flow path in the tubes 131 defined by the partitioning walls 131d is reduced, so that the heat transfer rate between the cooling water and walls defining the flow path is improved for a higher heat transfer performance.

The surfaces of the tubes 131 are coated beforehand (precoated) with an adhesive composed of a thermosetting resin material (to form an adhesive layer). By charging the assembled core portion 130 into a high-temperature furnace, for example, the fins 132 are bonded to the tubes 131 on the one hand, and the longitudinal ends of the tubes 131 are bonded to the tube holes 112a of the plate portions 112, 122 at the same time. The surface of the side plates 133 is also formed with a similar adhesive to bond the side plates 133 and the fins 132 to each other and the side plates 133 and the plate portions 112, 122 to each other.

The pipe portions 111a, 121a of the radiator 100 formed in this manner are connected to the cooling water path 20. In the fuel-cell 10, electricity (electric power) is generated by a chemical reaction between hydrogen and oxygen supplied to the two electrodes. The heat generated at the time of power generation is transmitted to the cooling water and, while the cooling water is passed through the radiator 100 by the water pump 21, is transferred to the atmosphere from the tubes 131 and the fins 132 thereby to cool the cooling water. As long as the power generating action of the fuel-cell 10 is low, heat is generated in a small amount, and the cooling water is controlled to flow through the bypass 22 by the thermostat 23 thereby to suppress the heat radiation from the radiator 100. In this way, the cooling water is cooled to a predetermined temperature (about 80° C.) or less by the radiator 100, with the result that the temperature is appropriately maintained during the operation of the fuel-cell 10.

During the power generating action of the fuel-cell 10, the internal cooling water is impressed with a high voltage. The radiator 100 is electrically insulated by the resin tanks 110, 120 and the second layer portion 131b of the tubes 131.

Since the heat transfer can be improved by the first layer portion 131a of the tubes 131, the cooling performance of the radiator 100 is not appreciably reduced in spite of the resin material basically employed.

Also, unlike the metal tubes, the fact that the tubes 131 are formed of a resin material can reduce both the weight and cost, while at the same time preventing flux used in brazing from oozing out into the cooling liquid at the time of brazing, thereby preventing the cooling liquid from being polluted.

Further, the provision of the adhesive layer on the surface of the tubes 131 can facilitate the coupling between the tubes 131 and the tanks 110, 120 and the coupling between the tubes 131 and the fins 132 (integral coupling in a high-temperature furnace).

OTHER EMBODIMENTS

Figure 5:
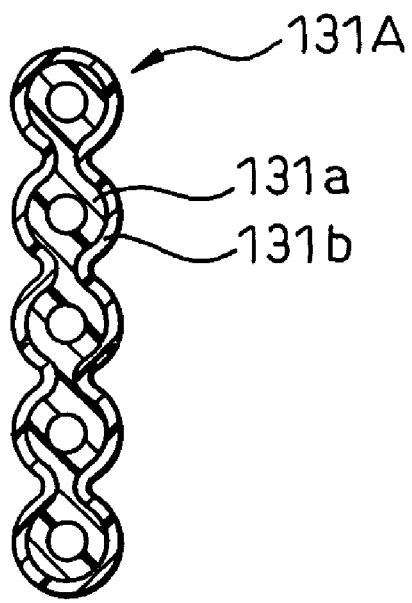
FIG. 5 is an enlarged sectional view showing the tube according to a first modified embodiment.
Figure 6:
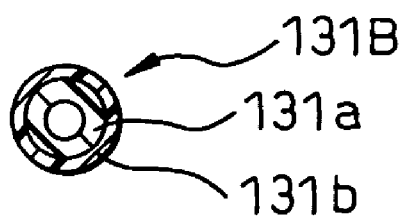
FIG. 6 is an enlarged sectional view showing the tube according to a second modified embodiment.

In the first embodiment, the tubes 131 are described as having a flat cross section. The invention, however, is not limited to this configuration and variously applicable as a configurations in which a plurality of round pipes are connected as shown in FIG. 5 or a single round pipe is formed as shown in FIG. 6.

Also, the tubes 131 are not formed necessarily by the multilayer extrusion molding process, but can be formed by other injection molding (multiple molding) processes.

Further, although the first layer portion 131a (high heat conductivity resin portion) of the tube 131 is formed inside and the second layer portion 131b (insulative resin portion) is formed outside, the first and second layer portions 131a, 131b may alternatively be formed in opposite relative positions.

Also, the tubes 131 and the fins 132 can be coupled by bonding to each other at normal temperature without any high-temperature furnace, or by welding in a high-temperature furnace without using the adhesive layer on the tubes 131.

Further, the tanks 110, 120 formed of the tank bodies 111, 121 and the plate portions 112, 122, respectively, can alternatively be formed integrally with each other.

Also, the fins 132 may be formed of resin instead of aluminum.

This invention is explained above in detail with reference to specified embodiments. Those skilled in the art, however, can variously modify or correct the embodiments without departing from the scope and spirit of the appended claims of the invention.

The invention claimed is:

1. A heat exchanger comprising:
   a plurality of tubes stacked; and
   a pair of tanks formed of resin and coupled to the longitudinal ends of the tubes;
   wherein the cooling liquid flowing in a fuel-cell is cooled by being passed through the tubes; and
   wherein the tubes are formed of double layers including a high heat conductivity resin portion and an insulative resin portion.

2. A heat exchanger according to claim 1,
   wherein the double-layer structure of the tubes is formed by the multilayer extrusion molding process.

3. A heat exchanger according to claim 1,
   wherein an adhesive layer is formed on the surface of the tubes.

4. A heat exchanger according to claim 1,
   wherein the insulative resin portion is formed on the inside of the tubes and the high heat conductivity resin portion is formed on the outside of the tubes.

5. A heat exchanger according to claim 1,
   wherein the high heat conductivity resin portion is formed of a metal-containing resin.

* * * * *